United States Patent
Yu et al.

(10) Patent No.: US 10,754,576 B2
(45) Date of Patent: Aug. 25, 2020

(54) PERFORMANCE EVALUATION APPARATUS AND PERFORMANCE EVALUATION METHOD

(71) Applicant: Shanghai Zhaoxin Semiconductor Co., Ltd., Shanghai (CN)

(72) Inventors: Zufa Yu, Shanghai (CN); Jie Jin, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 9 days.

(21) Appl. No.: 15/933,378

(22) Filed: Mar. 23, 2018

(65) Prior Publication Data

US 2019/0265905 A1 Aug. 29, 2019

(30) Foreign Application Priority Data

Feb. 24, 2018 (CN) .......................... 2018 1 0156857

(51) Int. Cl.
*G06F 3/00* (2006.01)
*G06F 3/06* (2006.01)
*G06F 11/07* (2006.01)
*G06F 11/30* (2006.01)
*G06F 13/16* (2006.01)
*G06F 11/34* (2006.01)

(52) U.S. Cl.
CPC .......... *G06F 3/0653* (2013.01); *G06F 3/0604* (2013.01); *G06F 3/0656* (2013.01); *G06F 3/0673* (2013.01); *G06F 11/0727* (2013.01); *G06F 11/3034* (2013.01); *G06F 11/34* (2013.01); *G06F 13/1673* (2013.01)

(58) Field of Classification Search
None
See application file for complete search history.

(56) References Cited

U.S. PATENT DOCUMENTS 6,976,122 B1 * 12/2005 Sander ................ G06F 12/0215
711/105

OTHER PUBLICATIONS

"DDR4 SDRAM," JESD79-4A, Joint Electron Device Engineering Council (JEDEC) Standard, Nov. 2013, pp. 1-218.

* cited by examiner

*Primary Examiner* — Midys Rojas
(74) *Attorney, Agent, or Firm* — JCIPRNET (57) ABSTRACT

A performance evaluation apparatus and a performance evaluation method are provided. The performance evaluation method includes: detecting multiple access commands of a memory controller for page miss so as to identify at least one page-missed command from the access commands; calculating an interval between the at least one page-missed command and a last conflict command to serve as a conflict command interval, wherein the last conflict command conflicts with the at least one page-missed command; and evaluating performance of the memory controller according to the conflict command interval.

15 Claims, 6 Drawing Sheets

PERFORMANCE EVALUATION APPARATUS AND PERFORMANCE EVALUATION METHOD

CROSS-REFERENCE TO RELATED APPLICATION

This application claims the priority benefit of China application serial no. 201810156857.0, filed on Feb. 24, 2018. The entirety of the above-mentioned patent application is hereby incorporated by reference herein and made a part of this specification.

BACKGROUND OF THE INVENTION

Field of the Invention

The invention relates to an evaluation method, and particularly relates to a performance evaluation apparatus and a performance evaluation method of a memory controller.

Description of Related Art

Generally, a bandwidth utilization of a memory may serve as a determination reference for evaluating performance of a memory controller. In most of the cases, the higher a page hit rate of access commands of the memory controller is, the higher the bandwidth utilization is, i.e. the memory controller has a better performance. Therefore, a conventional test method generally deduces the bandwidth utilization of the memory according to the page hit rate of the access commands, so as to determine the performance of the memory controller.

However, in some cases, although the page hit rate of the access commands is very high, the bandwidth utilization of the memory is reduced. Namely, in the conventional test method, the page hit rate is adopted to evaluate the performance of the memory controller, though the page hit rate cannot always correctly reflect a bandwidth usage state of the memory.

Therefore, it is necessary to provide a performance evaluation method of a memory controller to resolve the problem that the performance of the memory controller cannot be accurately evaluated.

SUMMARY OF THE INVENTION

An embodiment of the invention provides a performance evaluation method of a memory controller. The performance evaluation method includes: detecting a plurality of access commands of the memory controller for page miss so as to identify at least one page-missed command from the access commands; calculating an interval between the at least one page-missed command and a last conflict command to serve as a conflict command interval, where the last conflict command conflicts with the at least one page-missed command; and evaluating performance of the memory controller according to the conflict command interval.

An embodiment of the invention provides a performance evaluation apparatus including a sensing module and a calculation module. The sensing module detects a plurality of access commands of a memory controller for page miss so as to identify at least one page-missed command from the access commands. The calculation module is coupled to the sensing module. The calculation module calculates an interval between the at least one page-missed command and a last conflict command to serve as a conflict command interval, where the last conflict command conflicts with the at least one page-missed command. The calculation module evaluates performance of the memory controller according to the conflict command interval.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Embodiments of the invention provide a performance evaluation apparatus and a performance evaluation method capable of accurately evaluate performance of a memory controller.

The performance evaluation apparatus of the embodiments of the invention may calculate a conflict command interval between a page-missed command and a last conflict command each time when an access command takes place page miss, so as to learn whether a bandwidth of a memory is effectively used, and accordingly mitigate a problem that a page hit rate cannot correctly reflect a bandwidth usage state of the memory. Therefore, the performance evaluation method of the embodiments of the invention may accurately evaluate the performance of the memory controller.

Figure 1A:
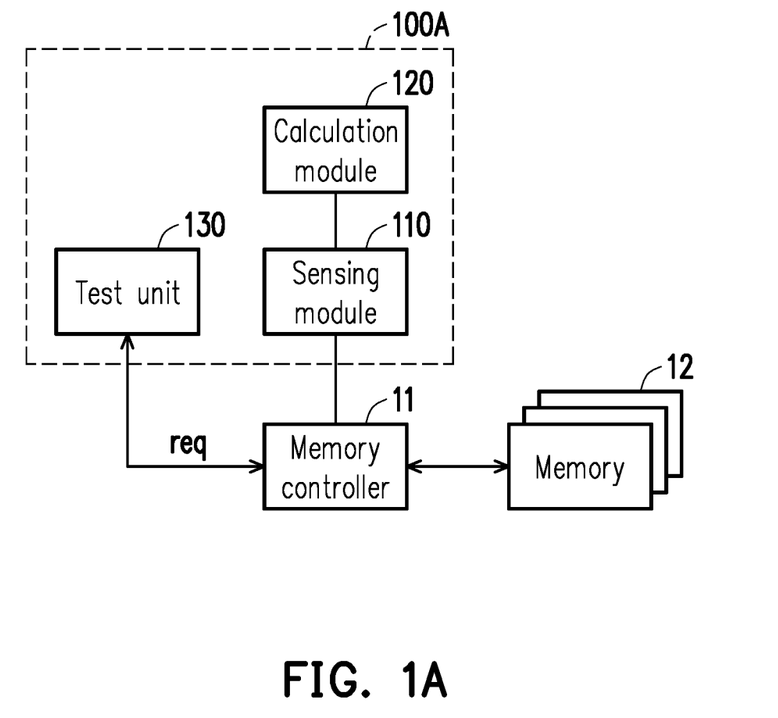
FIG. 1A is a circuit block schematic diagram of a performance evaluation apparatus according to an embodiment of the invention.

FIG. 1A is a circuit block schematic diagram of a performance evaluation apparatus 100A according to an embodiment of the invention. In the embodiment of FIG. 1A, the performance evaluation apparatus 100A may be a test machine of a memory controller 11. The performance evaluation apparatus 100A may perform function verification and performance evaluation to the memory controller 11 (device under test). The performance evaluation apparatus 100A includes a sensing module 110, a calculation module 120 and a test unit 130. The test unit 130 may provide a test pattern to the device under test (the memory controller 11), and the test pattern includes one or a plurality of access requests req. Implementation of the test unit 130 is not limited by the invention. For example, the test unit 130 may be a conventional memory test device or other test device/circuit.

The memory controller 11 may generate a corresponding access command to a memory 12 according to the received access request req, and the access command may be a read command or a write command. Namely, the memory controller 11 may perform an access operation to the memory 12 according to the access request req. According to a design requirement, the memory 12 may be a dynamic random access memory (DRAM).

Generally, the memory controller 11 may detect whether the access command has a page hit and/or has a page miss. The method that the memory controller 11 detects the access command is not limited by the present embodiment. For example, the detection may be conventional access command detection or other detection. The sensing module 110 may detect a plurality of the access commands generated by the memory controller 11 for page miss, so as to identify at least one page-missed command from the access commands. The calculation module 120 is coupled to the sensing module 110, and receives the pass-missed command output by the sensing module 110.

Generally, before the operation of reading a memory page or writing a memory page, it is required to determine whether the memory page to be accessed is in an open state. When the memory controller 11 sends the access command, if the memory page to be access is in a close state, the access command takes place "page miss". When the "page miss" is taken place, the memory controller 11 sends an auxiliary command according to a requirement to first close other memory page that is already in the open state, and then opens the memory page corresponding to the present access operation. If there is no memory page that is in the open state currently, the memory controller 11 directly sends the auxiliary command to open the memory page corresponding to the present access operation. In this way, the access command may access the memory page.

The calculation module 120 may find a last conflict command related to the page-missed command from the access commands, where the last conflict command and the page-missed command are two commands conflicting with each other. For example, the last conflict command and the page-missed command are two commands having a same bank address and different page addresses. The calculation module 120 may calculate an interval (which is referred to as a conflict command interval hereinafter) between the page-missed command and the last conflict command. The calculation module 120 may analyze an influence degree of the page-missed command on the bandwidth utilization of the memory according to the conflict command interval, so as to evaluate performance of the memory controller 11.

Figure 1B:
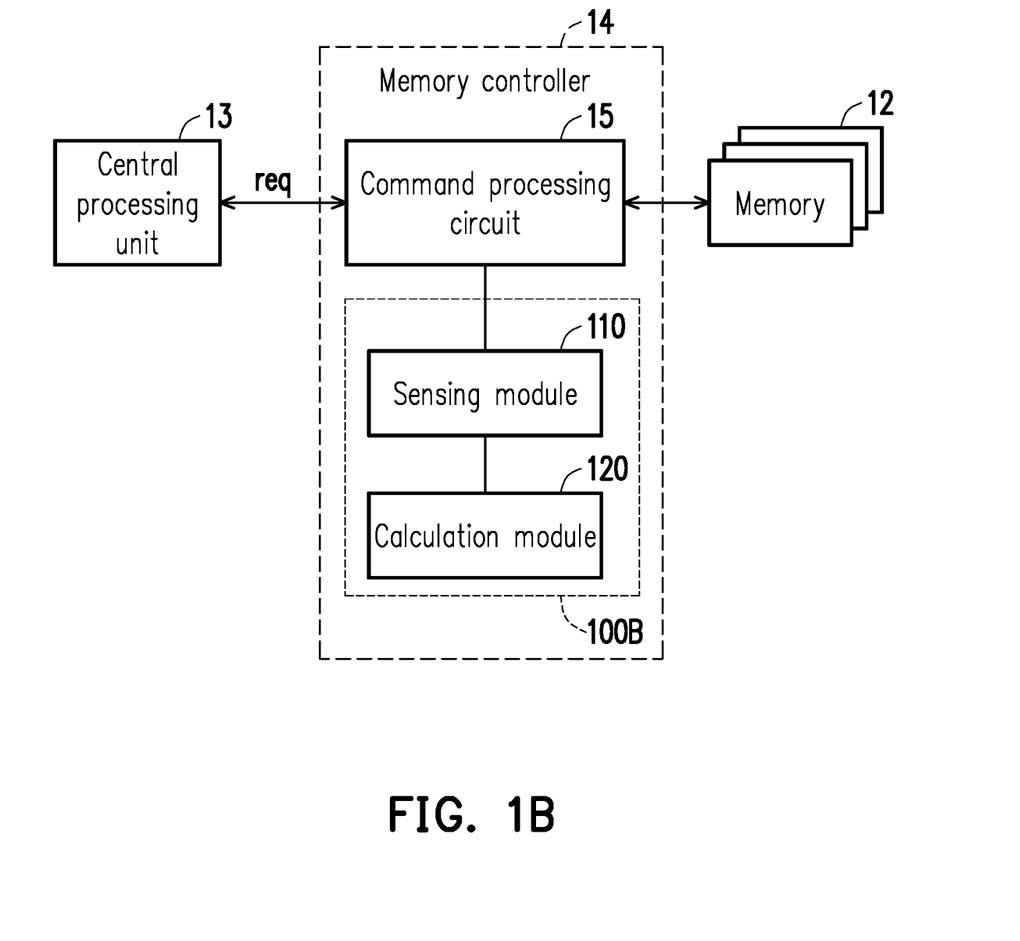
FIG. 1B is a circuit block schematic diagram of a performance evaluation apparatus according to another embodiment of the invention.

FIG. 1B is a circuit block schematic diagram of a performance evaluation apparatus 100B according to another embodiment of the invention. In the embodiment of FIG. 1B, the performance evaluation apparatus 100B may be configured in the memory controller 14. The performance evaluation apparatus 100B may evaluate the performance of the memory controller 14. The memory controller 14 further includes a command processing circuit 15. A central processing unit 13 may send the access request req to the memory controller 14 to access the memory 12. The command processing circuit 15 generates a corresponding access command to the memory 12 according to the received access command req, where the access command may be a read command or a write command. Namely, the memory controller 14 may perform an access operation to the memory 12 according to the access request req. Related description of FIG. 1A may be referred for the memory 12 of FIG. 1B, and detail thereof is not repeated.

Generally, the command processing circuit 15 may detect whether the access command takes place "page hit" and/or "page miss". A method that the command processing circuit 15 detects the access command is not limited by the present embodiment. For example, the detection may be the conventional access command detector or other detection.

The performance evaluation apparatus 100B includes the sensing module 110 and the calculation module 120. The sensing module 110 may detect a plurality of access commands generated by the memory controller 14 for page miss, so as to identify at least one page-missed command from the access commands. The sensing module 110 and the calculation module 120 of FIG. 1B may be deduced according to related description of FIG. 1A, and details thereof are not repeated.

Figure 2:
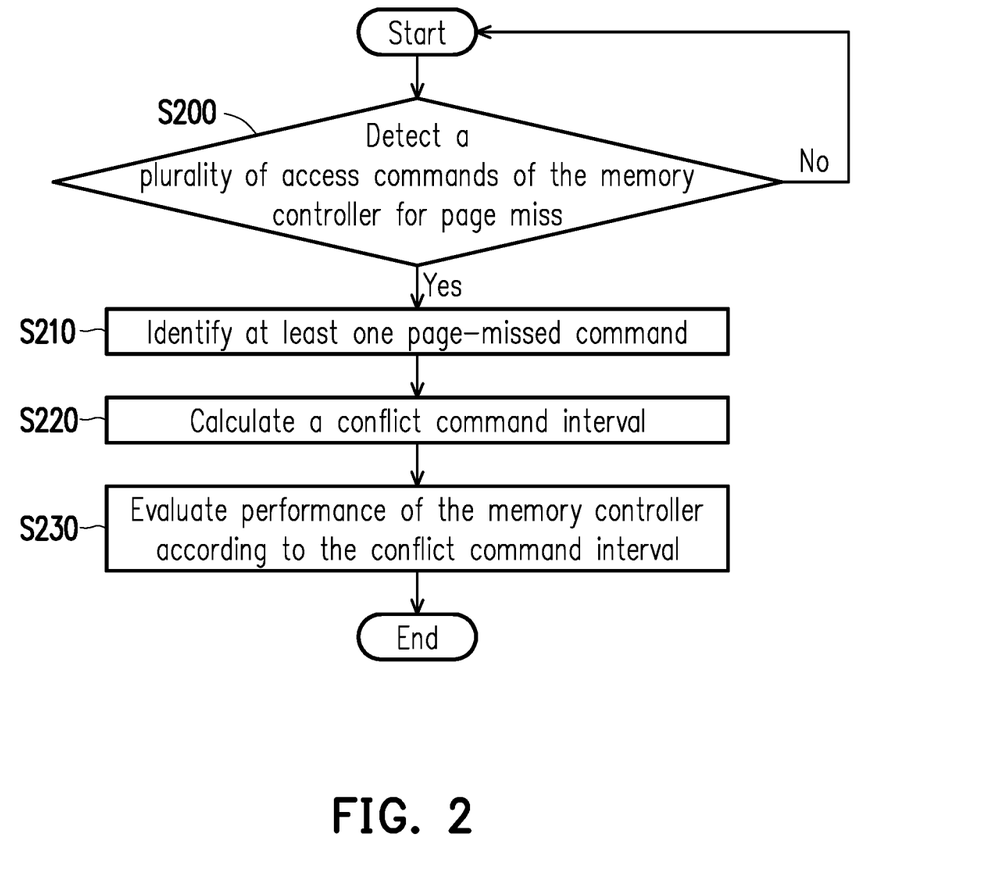
FIG. 2 is a flowchart illustrating a performance evaluation method of a memory controller according to an embodiment of the invention.

FIG. 2 is a flowchart illustrating a performance evaluation method of a memory controller according to an embodiment of the invention. Related description of FIG. 2 is adapted to the performance evaluation apparatus shown in FIG. 1A and/or FIG. 1B. Referring to FIG. 2, in step S200, the sensing module 110 detects a plurality of access commands of the memory controller 100 for page miss. If the sensing module 110 detects that the access commands do not have the page miss (the determination result of the step S200 is "negative"), the sensing module 110 executes the step S200 again. If the sensing module 110 detects that the access commands have the page miss (the determination result of the step S200 is "affirmative"), a step S210 is executed, i.e. the sensing module 110 identifies at least one page-missed command from the access commands, and outputs the at least one page-missed command to the calculation module 120. In step S220, the calculation module 120 finds a last conflict command related to the page-missed command from the access commands, and calculates an interval (a conflict command interval) between the page-missed command and the last conflict command. In step S230, the calculation module 120 evaluates performance of the memory controller 110 according to the conflict command interval.

Figure 3:
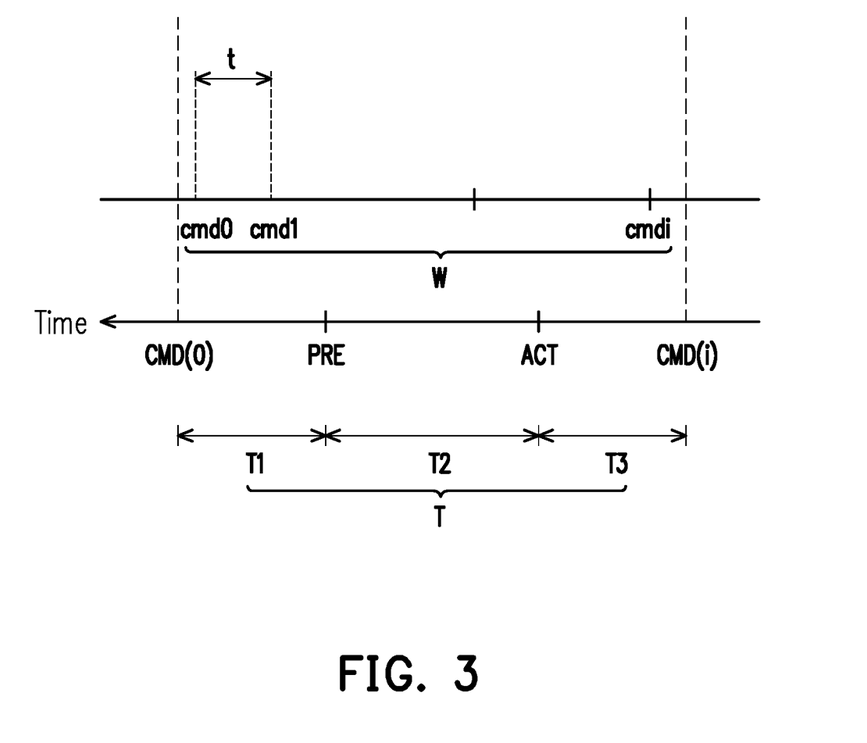
FIG. 3 is a schematic diagram of a window depth according to an embodiment of the invention.

A window concept is adopted to describe relevance between the conflict command interval and the memory bandwidth utilization below. FIG. 3 is a schematic diagram of a window depth according to an embodiment of the invention. A horizontal axis shown in FIG. 3 represents time, and a left side of the horizontal axis represents the latest time. Commands cmd0, cmd1, . . . , cmdi shown in FIG. 3 represent the access commands of the memory controller 100, for example, read commands or write commands. The command CMD(0) and the command CMD(i) shown in FIG. 3 represents two commands in the access commands cmd0-cmdi. As shown in FIG. 3, it is assumed that the access command CMD(0) conflicts with the previously sent access command CMD(i), and there is an auxiliary command execution time T between the access command CMD(0) and the access command CMD(i). The memory controller may send an auxiliary command during the auxiliary command execution time T, so as to eliminate the conflict between the access command CMD(0) and the access command CMD(i). The auxiliary command may be a pre-charge command PRE, an active command ACT and/or other auxiliary command. The pre-charge command PRE may be used for closing a memory page, and the active command ACT is used for activating the memory page.

It is assumed that the pre-charge command PRE and the active command ACT are configured between the access command CMD(0) and the access command CMD(i), where a rated time interval between the access command CMD(0) and the pre-charge command PRE is T1, a rated time interval between the pre-charge command PRE and the active command ACT is T2, and a rated time interval between the active command ACT and the access command CMD(i) is T3. If at most W continuous commands that are not conflicted with each other are arranged within the auxiliary command execution time T (T=T1+T2+T3), W may be defined as a window depth, where a time interval of the W continuous commands that are not conflicted with each other is t. Namely, the window depth W relates to the auxiliary command execution time T.

Regarding a memory bank, since only one of the memory pages therein is accessed each time, when the memory controller 100 respectively sends access commands to different pages of a certain memory band, it is required to switch between the different pages, which results in a conflict between two access commands having different page addresses. A switching mode between the two access command having the conflict may include four command switching situations of "a read command is switched to a write command", "a write command is switched to a read command", "a read command is switched to a read command", and "a write command is switched to a write command". Therefore, when the window depth is selected/determined, the maximum one of the W values respectively calculated in the aforementioned four command switching situations is taken as the final window depth.

As shown in FIG. 3, if an interval (the conflict command interval) between two conflict commands is greater than or equal to the window depth W, it represents that the conflict command interval is enough to execute the auxiliary command, and the memory controller 100 may insert the auxiliary command within the conflict command interval (the auxiliary command execution time T) to eliminate the command conflict. Since the memory controller 100 is unnecessary to spend an extra time to wait for execution of the auxiliary command, the bandwidth of the memory may be effectively used. If the interval (the conflict command interval) between two conflict commands is smaller than the window depth W, it represents that the conflict command interval is not enough to execute the auxiliary command, and the memory controller 100 requires to spend an extra time to wait for execution of the auxiliary command, so that the bandwidth of the memory cannot be effectively used. Therefore, the calculation module 120 may evaluate the performance of the memory controller according to the conflict command interval T and the window depth W.

Figure 4:
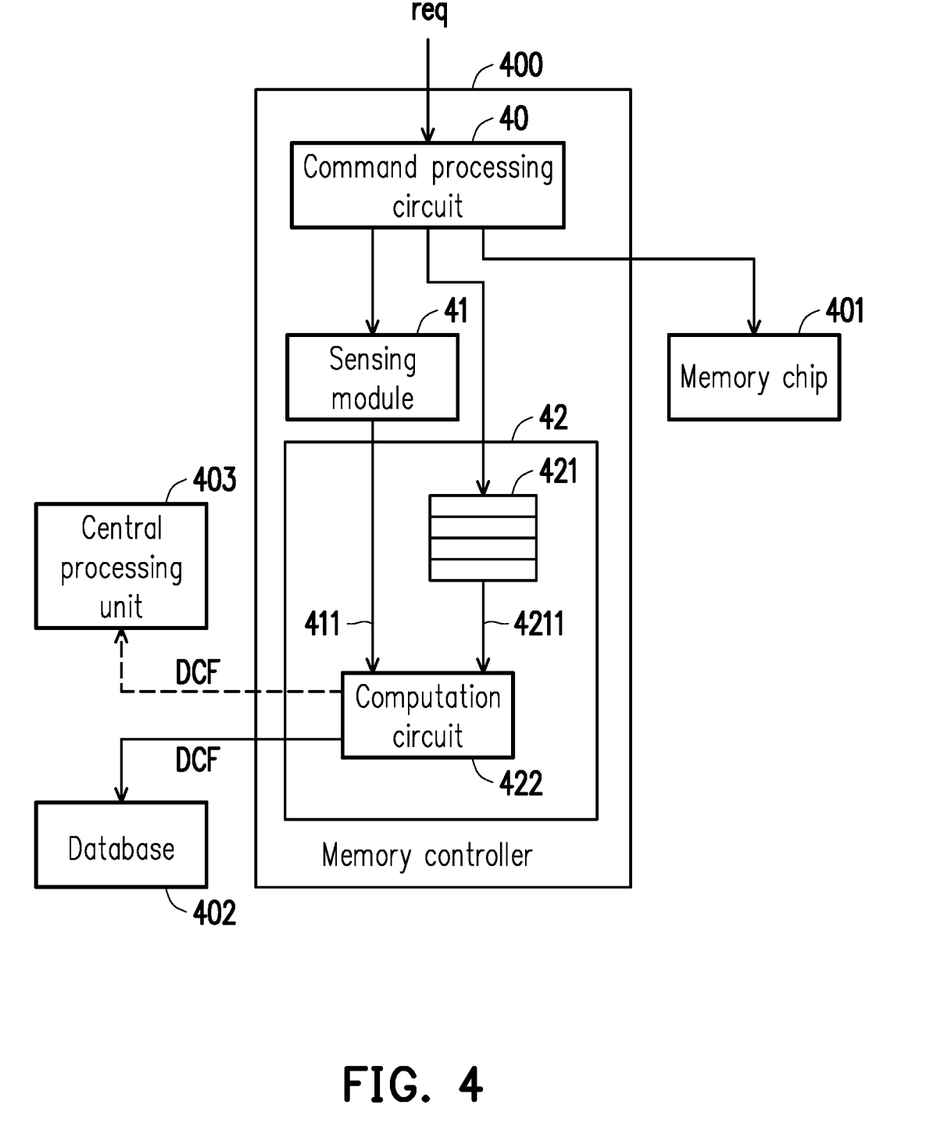
FIG. 4 is a circuit block schematic diagram of a memory controller according to another embodiment of the invention.

FIG. 4 is a circuit block schematic diagram of a memory controller 400 according to another embodiment of the invention. Related description of FIG. 2 is adapted to the embodiment of FIG. 4. As shown in FIG. 4, the memory controller 400 includes a command processing circuit 40, a sensing module 41 and a calculation module 42. Descriptions of the memory controller 400, the command processing circuit 40, the sensing module 41 and the calculation module 42 shown in FIG. 4 may be deduced by referring to related descriptions of the memory controller 14, the command processing circuit 15, the sensing module 110 and the calculation module 120 of FIG. 1B.

The command processing circuit 40 may sort and decode the access requests req received by the memory controller 400, and transform the same into a plurality of access commands, where the access command may be a read command or a write command. The command processing circuit 400 may output the access commands to a memory chip 401, so as to access the memory chip 401. According to a design requirement, the memory chip 401 may include a volatile memory chip and/or a non-volatile memory chip. The volatile memory chip may include a Static Random Access Memory (SRAM) chip, a Dynamic Random Access Memory (DRAM) and/or other chips. The non-volatile memory chip may include a flash memory chip and/or other chips. In the embodiment of FIG. 4, the memory chip 401 may be a DRAM chip.

The sensing module 41 may detect the access commands generated by the command processing circuit 40 for page miss, so as to identify at least one page-missed command 411 from the access commands. The calculation module 42 is coupled to the command processing circuit 40 and the sensing module 41. The calculation module 42 includes a command buffer 421 and a computation circuit 422. The command buffer 421 may store a part of or all of the access commands. For example (but the invention is not limited thereto), a capacity of the command buffer 421 may be determined by the window depth W described in FIG. 3. The computation circuit 412 may receive the page-missed command 411 identified by the sensing module 41, and find a last conflict command 4211 related to the page-missed command 411 from the command buffer 421, so as to calculate an interval (a conflict command interval) between the page-missed command 411 and the last conflict command 4211. The computation circuit 422 of the calculation module 42 may calculate a difference between the window depth W and the conflict command interval. The calculation module 42 may calculate a discrete conflict factor DCF according to the difference, where the discrete conflict factor DCF may be used for evaluating the performance of the memory controller.

After the computation circuit 422 calculates the conflict command interval, the computation circuit 422 may further calculate the discrete conflict factor DCF according to the conflict command interval and the window depth W, so as to evaluate the performance of the memory controller 400 according to the discrete conflict factor DCF. For example, the discrete conflict factor $$DCF = A\left(\sum_{i=0}^{M}(W - N_i)\right)/I,$$

where A is a real number (serving as a magnification of an observation statistical result), M is a command number of the at least one page-missed command during a statistical period, $N_i$ is a conflict command interval of an command in the at least one page-missed command, and I is the number of the access requests received by the memory controller during the statistical period.

Figure 5:
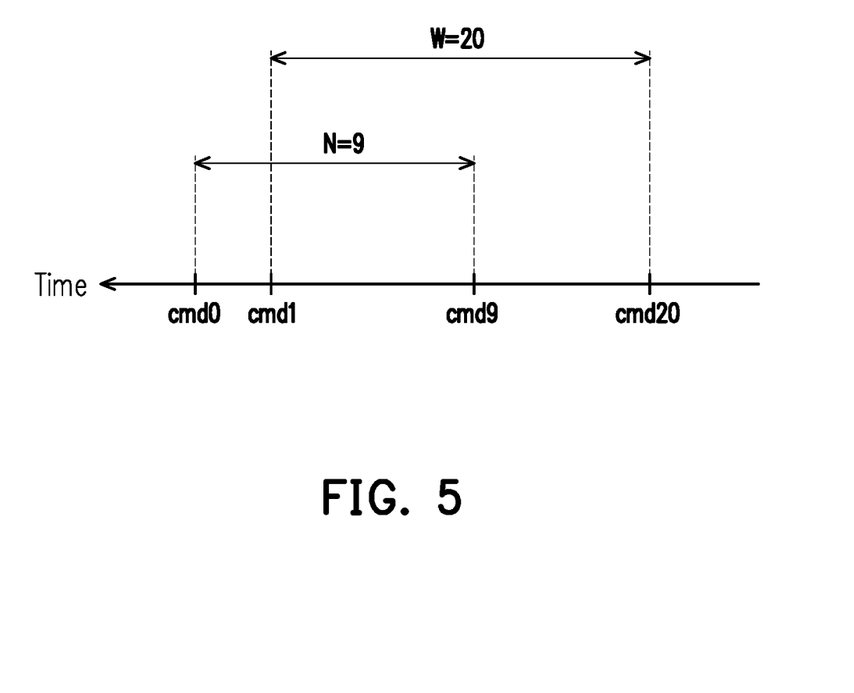
FIG. 5 is a schematic diagram of calculating a discrete conflict factor according to an embodiment of the invention.

Calculation of the discrete conflict factor DCF is described with reference of FIG. 5, and FIG. 5 is a schematic diagram of calculating the discrete conflict factor DCF according to an embodiment of the invention. A horizontal axis of FIG. 5 represents time, and a left side of the horizontal axis represents the latest time. Commands cmd0, cmd1, . . . , cmd9, . . . , cmd20 shown in FIG. 5 are the access commands sent to the memory chip 401 by the memory controller 400. As shown in FIG. 5, it is assumed that the window depth W=20 and the access command cmd0 takes place an page miss, and it is assumed that the access command cmd0 conflicts with the access command cmd9 previously sent by the memory controller 400, so that the conflict command interval $N_i$=9. The computation circuit 422 may calculate the discrete conflict factor $DCF_i$=W−$N_i$=20−9=11 corresponding to this (the $i^{th}$) page miss. After summing the discrete conflict factors $DCF_i$ of a plurality of the access commands having the page miss during the statistical period, the final discrete conflict factor DCF is obtained.

In the embodiment of FIG. 4, the access requests req are first reordered and decoded by the command processing circuit 40 for transforming into a plurality of access commands, and then the computation circuit 422 calculates the discrete conflict factor DCF according to the reordered access commands. In another embodiment, the computation circuit 422 may also calculate the discrete conflict factor DCF according to the access requests req (undecoded access commands). For example, the computation circuit 422 calculates a read command discrete conflict factor DCF1 according to a read request (undecoded read command), and calculates a write command discrete conflict factor DCF2 according to a write request (undecoded write command), and sums the read command discrete conflict factor DCF1 and the write command discrete conflict factor DCF2 to obtained the final discrete conflict factor DCF.

Moreover, the computation circuit 422 of FIG. 4 may regularly (or irregularly) calculate a plurality of discrete conflict factors DCF of different time points. In some embodiments, the computation circuit 422 may record the series of discrete conflict factors DCF in a database 402 to serve as a later design reference, and/or serve as an adjustment reference of system performance. In some other embodiments, the computation circuit 422 may also provide the real-time discrete conflict factors DCF to the central processing unit 403 (or a host), such that a program of the central processing unit 403 may perform a real-time performance adjustment.

A read operation of the memory is taken as an example for description. A following table 1 is a simulation test result of the memory controller 400 based on different coding strategies in case that different test patterns are used. Calculation of the discrete conflict factors DCF is based on an assumption that the real number A=1000 and the window depth W=20.

TABLE 1 simulation test result of memory controller

| Test pattern | Coding strategy | Page hit rate (read/write) | Bandwidth utilization | DCF |
|---|---|---|---|---|
| A | C | 85.05%/82.68% | 68.71% | 129 |
|   | D | 94.88%/92.56% | 67.02% | 171 |
| B | C | 85.19%/82.09% | 64.26% | 234 |
|   | D | 94.65%/94.14% | 70.42% | 120 |

As shown in the table 1, in the simulation test of the test pattern A, when the memory controller 400 adopts the coding strategy C to perform the simulation test, a page hit rate of the read operation is 85.05%, and a page hit rate of the write operation is 82.68%, the bandwidth utilization is 68.71%, and the discrete conflict factor DCF=129. When the memory controller 400 adopts the coding strategy D to perform the simulation test, a page hit rate of the read operation is 94.88%, and a page hit rate of the write operation is 92.56%, the bandwidth utilization is 67.02%, and the discrete conflict factor DCF=171. According to the test result of the table 1, it is known that the page hit rate (85.05%) of the read operation of the coding strategy C is smaller than the page hit rate (94.88%) of the read operation of the coding strategy D, though the bandwidth utilization (68.71%) of the coding strategy C is greater than the bandwidth utilization (67.02%) of the coding strategy D. Therefore, the test result of the table 1 indicates that the page hit rate of the test pattern A cannot truly reflect the bandwidth usage rate of the memory controller 400.

Moreover, since the smaller the discrete conflict factor DCF is, the lower degree that the access command has a conflict, the bandwidth utilization of the memory is higher. According to the table 1, it is known that regarding the test pattern A, the discrete conflict factor DCF (129) of the coding strategy C is smaller than the discrete conflict factor DCF (171) of the coding strategy D, and the bandwidth utilization (68.71%) of the coding strategy C is greater than the bandwidth utilization (67.02%) of the coding strategy D. Since the discrete conflict factor DCF may accurately reflect a variation of the bandwidth utilization, the discrete conflict factor DCF may be used to accurately evaluate the performance of the memory controller 400.

As shown in the table 1, in the simulation test of the test pattern B, when the memory controller 400 adopts the coding strategy C to perform the simulation test, a page hit rate of the read operation is 85.19%, and a page hit rate of the write operation is 82.09%, the bandwidth utilization is 64.26%, and the discrete conflict factor DCF=234. When the memory controller 400 adopts the coding strategy D to perform the simulation test, a page hit rate of the read operation is 94.65%, and a page hit rate of the write operation is 94.14%, the bandwidth utilization is 70.42%, and the discrete conflict factor DCF=120. According to the test result of the table 1, it is known that when the discrete conflict factor DCF (234) of the coding strategy C is greater than the discrete conflict factor DCF (120) of the coding strategy D, the bandwidth unitization (64.26%) of the coding strategy C is smaller than the bandwidth unitization (70.42%) of the coding strategy D. Therefore, in case that the page hit rate and the bandwidth utilization presents a positive correlation, the discrete conflict factor DCF may still correctly reflect the variation of the bandwidth utilization.

The blocks of the performance evaluation apparatus 100A, the sensing module 110, the calculation module 120, the test unit 130, the memory controller 14, the command processing circuit 15, the performance evaluation apparatus 100B, the sensing module 110, the calculation module 120, the command processing circuit 40, the sensing module 41, the calculation module 42 and/or the computation circuit 422 may be implemented by logic circuits (hardware) formed on an integrated circuit, and may also be implemented by a Central Processing Unit (CPU) through software. In the later case, related functions of the performance evaluation apparatus 100A, the sensing module 110, the calculation module 120, the test unit 130, the memory controller 14, the command processing circuit 15, the performance evaluation apparatus 100B, the sensing module 110, the calculation module 120, the command processing circuit 40, the sensing module 41, the calculation module 42 and/or the computation circuit 422 may be implemented as programming codes of the software (i.e. a program). The software (i.e. the program) may be read by a computer (or a CPU), and may be recorded/stored in a Read Only Memory (ROM), a storage device (which is referred to as a "recording medium") and/or a Random Access Memory (RAM). Moreover, the computer (or the CPU) read the programs from the recording medium to execute the program, so as to achieve the corresponding functions. The recording medium may be implemented by a non-transitory computer readable medium, such as a tape, a disk, a card, a semiconductor memory, a programmable logic circuit, etc. Moreover, the program may also be provided to the computer (or the CPU) through any transmission medium (for example, a communication network or radio waves). The communication network is, for example, the Internet, a wired communication network, a wireless communication network or other communication media.

In different application situations, related functions of the performance evaluation apparatus 100A, the sensing module 110, the calculation module 120, the test unit 130, the memory controller 14, the command processing circuit 15, the performance evaluation apparatus 100B, the sensing module 110, the calculation module 120, the command processing circuit 40, the sensing module 41, the calculation module 42 and/or the computation circuit 422 may be implemented as software, firmware or hardware by using general programming languages (for example, C or C++), hardware description languages (for example, Verilog HDL or VHDL) or other proper programming languages. Regarding the hardware implementation, one or more controllers, a micro controller, a microprocessor, an Application-Specific Integrated Circuit (ASIC), a Digital Signal Processor (DSP), a Field Programmable Gate Array (FPGA) and/or various logic blocks, modules and circuits in other processing unit may be applied to implement or execute the functions of the embodiments of the invention. Moreover, the apparatus and the method of the invention may be implemented through a combination of hardware, firmware and/or software.

In summary, the memory controller of the embodiments of the invention may calculate the discrete conflict factor DCF according to each page-missed command, and uses the discrete conflict factor DCF to evaluate whether the bandwidth of the memory is effectively used. In view of the conventional technique, the page hit rate cannot always correctly reflect the bandwidth usage state of the memory. Therefore, the performance evaluation method of the invention may accurately evaluate the performance of the memory controller.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A performance evaluation method of a memory controller, comprising:
   detecting a plurality of access commands of the memory controller to identify at least one page-missed command from the plurality of access commands;
   calculating a time interval between the at least one page-missed command and a last conflict command to serve as a conflict command interval, wherein in a conflict status, the last conflict command conflicts with the at least one page-missed command; and
   evaluating performance of the memory controller according to the conflict command interval.

2. The performance evaluation method of the memory controller as claimed in claim 1, wherein the access commands comprise a first command and a second command conflicting with each other, an auxiliary command execution time is disposed between the first command and the second command to eliminate conflict, and the performance evaluation method further comprises:
   determining a window depth according to the auxiliary command execution time, wherein the window depth represents a quantity of continuous commands that do not conflict with each other within the auxiliary command execution time,
   wherein the step of evaluating the performance of the memory controller comprises evaluating the performance of the memory controller according to the conflict command interval and the window depth.

3. The performance evaluation method of the memory controller as claimed in claim 2, wherein the step of evaluating the performance of the memory controller comprises:
   calculating a difference between the window depth and the conflict command interval; and
   calculating a discrete conflict factor according to the difference, wherein the discrete conflict factor is used for evaluating the performance of the memory controller.

4. The performance evaluation method of the memory controller as claimed in claim 3, wherein the step of calculating the discrete conflict factor comprises:
   calculating $$DCF = A\left(\sum_{i=0}^{M}(W - N_i)\right)/I,,$$

wherein DCF is the discrete conflict factor, A is a constant parameter, M is a quantity of identified of page-missed commands during a statistical period, W is the window depth, $N_i$ is the conflict command interval of an $i^{th}$ command in the at least one page-missed command, and I is the number of access requests received by the memory controller during the statistical period.

5. The performance evaluation method of the memory controller as claimed in claim 3, further comprising:
   recording the discrete conflict factor in a database.

6. The performance evaluation method of the memory controller as claimed in claim 3, further comprising:
   providing the discrete conflict factor to a central processing unit, so as to perform a performance adjustment through a program executed in the central processing unit.

7. The performance evaluation method of the memory controller as claimed in claim 1, wherein a definition of the conflict status comprises: the last conflict command and the page-missed command have a same bank address, and the last conflict command and the page-missed command have different page addresses.

8. A performance evaluation apparatus, configured to evaluate performance of a memory controller, the performance evaluation apparatus comprising:
   a sensing module, detecting a plurality of access commands of the memory controller to identify at least one page-missed command from the plurality of access commands; and a calculation module, coupled to the sensing module, calculating a time interval between the at least one page-missed command and a last conflict command to serve as a conflict command interval, and evaluating performance of the memory controller according to the conflict command interval, wherein in a conflict status, the last conflict command conflicts with the at least one page-missed command.

9. The performance evaluation apparatus as claimed in claim 8, wherein the access commands comprise a first command and a second command conflicting with each other, and an auxiliary command execution time is disposed between the first command and the second command to eliminate conflict,
- wherein the calculation module determines a window depth according to the auxiliary command execution time and evaluates the performance of the memory controller according to the conflict command interval and the window depth,
- wherein the window depth represents a quantity of continuous commands that do not conflict with each other within the auxiliary command execution time.

10. The performance evaluation apparatus as claimed in claim 9, wherein the calculation module comprises:
- a command buffer, storing a part of or all of the access commands,
- wherein when the sensing module identifies the at least one page-missed command, the calculation module finds the last conflict command related to the at least one page-missed command from the command buffer, and calculates the conflict command interval between the at least one page-missed command and the last conflict command.

11. The performance evaluation apparatus as claimed in claim 10, wherein the calculation module calculates a difference between the window depth and the conflict command interval, and the calculation module calculates a discrete conflict factor according to the difference, wherein the discrete conflict factor is used for evaluating the performance of the memory controller.

12. The performance evaluation apparatus as claimed in claim 11, wherein the calculation module calculates $$DCF = A\left(\sum_{i=0}^{M}(W - N_i)\right)/I,$$

wherein DCF is the discrete conflict factor, A is a constant parameter, M is a quantity of identified page-missed commands during a statistical period, W is the window depth, $N_i$ is the conflict command interval of an $i^{th}$ command in the at least one page-missed command, and I is the number of access requests received by the memory controller during the statistical period.

13. The performance evaluation apparatus as claimed in claim 11, wherein the calculation module records the discrete conflict factor in a database.

14. The performance evaluation apparatus as claimed in claim 11, wherein the calculation module provides the discrete conflict factor to a central processing unit, so as to perform a performance adjustment through a program executed in the central processing unit.

15. The performance evaluation apparatus as claimed in claim 8, wherein a definition of the conflict status comprises: the last conflict command and the page-missed command have a same bank address, and the last conflict command and the page-missed command have different page addresses.

* * * * *